(12) United States Patent
Baldwin

(10) Patent No.: US 9,030,627 B1
(45) Date of Patent: May 12, 2015

(54) LIQUID CRYSTAL DISPLAY WITH LIGHT GUIDE

(75) Inventor: Leo B. Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 205 days.

(21) Appl. No.: 13/603,561

(22) Filed: Sep. 5, 2012

(51) Int. Cl.
*G02F 1/1335* (2006.01)

(52) U.S. Cl.
CPC .... *G02F 1/133606* (2013.01); *G02F 1/133615* (2013.01)

(58) Field of Classification Search
USPC ............. 349/63, 61, 62, 64, 65, 113
See application file for complete search history.

(56) References Cited

U.S. PATENT DOCUMENTS

| | | | | |
|---|---|---|---|---|
| 5,619,356 A | * | 4/1997 | Kozo et al. | 349/99 |
| 6,266,108 B1 | * | 7/2001 | Bao et al. | 349/63 |
| 6,295,104 B1 | * | 9/2001 | Egawa et al. | 349/63 |
| 6,379,017 B2 | * | 4/2002 | Nakabayashi et al. | 362/619 |
| 6,671,013 B1 | * | 12/2003 | Ohkawa | 349/62 |
| 6,742,907 B2 | * | 6/2004 | Funamoto et al. | 362/625 |
| 6,936,313 B2 | * | 8/2005 | Sakata et al. | 428/1.53 |

* cited by examiner

*Primary Examiner* — James Dudek
(74) *Attorney, Agent, or Firm* — Sutherland Asbill & Brennan LLP

(57) ABSTRACT

Devices such as electronic book readers, tablet computers, laptops, and so forth may use reflective liquid crystal display ("LCD") technologies. Described herein are devices and methods for illuminating the reflective LCD with a light guide panel. The light guide panel is configured with diffractive or other optical features configured to distribute light to the reflective LCD. A directive reflector may be arranged behind the reflective LCD to improve overall reflectivity by directing impinging light such that optical obstructions such as transistors and electrical traces within the reflective LCD are avoided.

8 Claims, 7 Drawing Sheets

LIQUID CRYSTAL DISPLAY WITH LIGHT GUIDE

BACKGROUND

A variety of devices, such as electronic book ("e-Book") reader devices, desktop computers, portable computers, smartphones, tablet computers, game consoles, televisions, and so forth are used to access various forms of content. These devices may be subjected to varying lighting conditions within images are presented.

Figure 1:
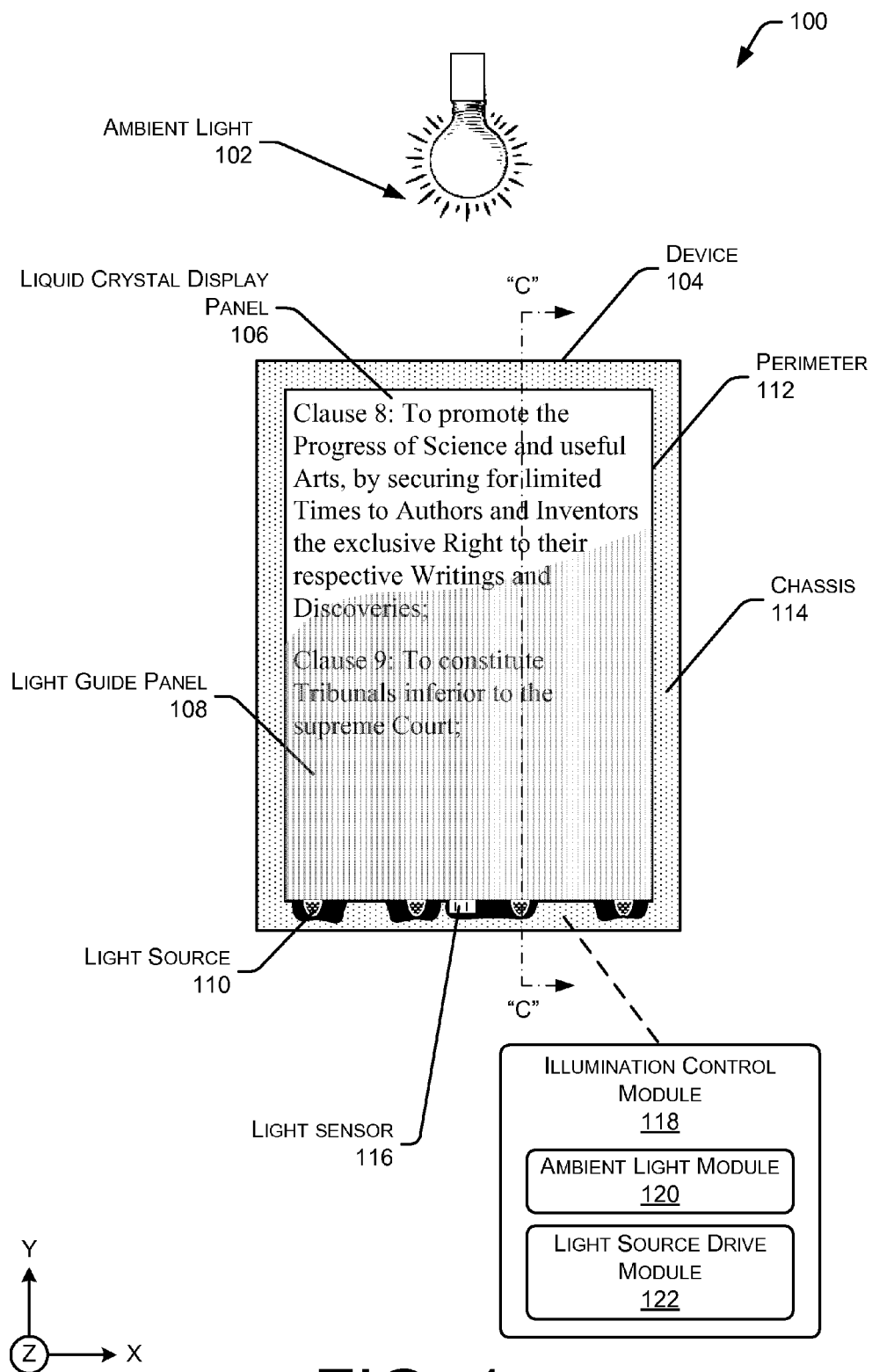
FIG. 1 illustrates a device (not to scale) comprising a liquid crystal display ("LCD") with a light guide panel configured to illuminate the LCD.

Certain implementations will now be described more fully below with reference to the accompanying drawings, in which various implementations and/or aspects are shown. However, various aspects may be implemented in many different forms and should not be construed as limited to the implementations set forth herein. Like numbers refer to like elements throughout.

DETAILED DESCRIPTION

A variety of devices, such as electronic book ("e-Book") reader devices, desktop computers, portable computers, smartphones, tablet computers, televisions, and so forth are used to access various forms of content and other information. Liquid crystal displays ("LCD") use liquid crystals to generate images. Liquid crystal displays may be configured to operate in reflective, transmissive, or transflective modes.

In a reflective LCD, a reflector is disposed behind the LCD and configured to reflect ambient light back through the LCD generally towards the user. However, in low light conditions such as room lights or total darkness, the user may have difficulty seeing the image produced.

In comparison, a transmissive or backlit LCD has a source of illumination arranged behind the LCD. The illumination passes through the LCD and eventually to the user. While transmissive displays offer good performance in low light conditions, the images produced may become washed out in bright light when the ambient illumination overwhelms the image formed by light from the illumination source. Additionally, the source of illumination may consume relatively large amounts of power, particularly in portable devices.

A transflective LCD attempts to overcome the limitations of both by placing a semi-reflective material (or "transflector") behind the LCD. A source of illumination is then placed behind the transflector. In bright light conditions, some light reflects from the transflector allowing operating in a reflective mode. In low light conditions, some light from the source of illumination may pass through the transflector to illuminate the LCD. However, the transflector is a compromise material in that it is configured to both reflect and transmit. As a result, performance as a reflector or as a transmitter is limited.

Described in this disclosure are display devices using a light guide panel with light sources in conjunction with a reflective LCD. The light guide panel comprises one or more materials configured to direct light along a planar surface. In one implementation, the light guide panel may be used to frontlight the reflective LCD by directing at least a portion of light from one or more light sources onto a portion of the reflective LCD. During low light conditions, light from the one or more light sources is distributed via the light guide panel to the reflective LCD to present an image. During bright light conditions the ambient light is reflected to present the image and the light sources may be inactive. The intensity of illumination may be configured to vary, such as based on a level of ambient light, user preference, available power, and so forth.

The reflective LCD may comprise display components or elements such as circuit traces, insulators, and other features which are disruptive to incident light. The incident light includes ambient light or emitted light from the one or more light sources as distributed by the light guide panel. These display components may block, scatter, diffract, refract, reflect, distort, or otherwise alter the path of incident light. This may result in a decrease in overall reflectivity of the display. In some implementations, a directive reflector may be placed behind the LCD such that a portion of the incident light is directed to avoid the display components. By avoiding the display component, overall reflectivity is improved, further improving performance of the display.

Illustrative Devices

FIG. 1 illustrates an environment 100 which may include ambient light 102 and a device 104. The device 104 may comprise an electronic book ("e-Book") reader device, a computer display, a portable computer, a smartphone, a tablet computer, a game console, a television, an in-vehicle display, and so forth. For clarity of illustration, the figures in this disclosure are not depicted to scale. For ease of description, three axes orthogonal to one another are shown, designated as X, Y, and Z.

The ambient light 102, when present, may be provided by artificial lighting such as a light bulb, by natural lighting such as the sun, or a combination. The ambient light 102 may be provided by a point source such as the sun or other highly localized source, or a diffuse source such as a cloudy sky. The ambient light 102 may comprise photons in infrared wavelengths, visible wavelengths, ultraviolet wavelengths, or a combination thereof.

The ambient light 102 may impinge on at least a portion of the device 104. The device 104 may comprise one or more reflective liquid crystal displays which may be configured to present visual information to a user. Displays may be emissive, reflective, or both. An emissive display emits light to present an image while reflective displays use incident light to present an image. This incident light may be provided by the sun, general illumination in the room, a reading light, a frontlight, and so forth. The display may be configured to present images in monochrome, color, or both.

In the implementation shown here, the display comprises a reflective liquid crystal display panel 106 ("display panel"). For ease of discussion, and not by way of limitation, in this disclosure, "front" indicates a side which may be proximate to a user during typical use of the device 104, while "back" indicates a side opposite the front which is distal to the user during typical use, along the Z axis depicted here.

The reflective liquid crystal display panel 106 may comprise one or more of electrodes, liquid crystal material, polarizers, or color filters. A reflector may be optically coupled to the liquid crystal display panel 106, or integrated therein. The reflector is configured to reflect incident light. The incident light may comprise ambient light 102, emitted light from the one or more light sources, or both. In some implementations the reflector may comprise a mirror, film, paint, coating, and so forth. For example, aluminum may be deposited on a back side of a second polarizer in the display panel 106 to form the reflector. Other materials may also be used to form the reflector including, but not limited to, silver or gold. The thickness of the deposited layer may be at least 800 nanometers. In some implementations, the mirror may comprise one or more dielectric materials to form a dielectric mirror.

The reflector may be configured to be directive in that incident light is directed along particular paths. Some of the components in the display panel 106 may be optically disruptive. That is, these components may block or distort light in ways which are undesirable from a standpoint of overall reflectivity of the display panel 106. For example, the electrodes within the liquid crystal display configured to control the liquid crystal material may result in areas of decreased transmittance. The directive reflector is configured to direct incident light to avoid at least a portion of a plurality of the display components which may be optically disruptive.

Arranged in front of the display panel 106 is a light guide panel 108. The light guide panel 108 may be laminated to the display panel 106. The light guide panel 108 is substantially planar and may comprise one or more materials such as plastic, glass, aerogel, metal, ceramic, and so forth. The light guide panel 108 may be configured with one or more features on the surface thereof, integral with, or embedded within, which are configured to direct light along pre-determined paths. These features may be refractive, diffractive, reflective, and so forth. In one implementation, the features may comprise a plurality of surface relief structures. These structures may be on the order of about 10 microns or less in one lateral dimension.

The light guide panel 108 is configured to distribute at least a portion of light emitted from one or more light sources 110 to the display panel 106. In some implementations, the light guide panel 108 or a portion thereof may be configured to fluoresce, such as upon application of ultraviolet light. The light sources 110 are shown here in a cutaway view of the interior of the chassis 114. The one or more light sources 110 are configured to emit light when activated. The light emitted may comprise photons in infrared wavelengths, visible wavelengths, ultraviolet wavelengths, or a combination thereof. Each light source 110 may comprise one or more light-emitting diodes ("LED"), cold cathode fluorescent lamp ("CCFL"), electroluminescent materials, sonoluminescent materials, fluorescent lights, incandescent lights, or a combination thereof. In some implementations, different types of light sources 110 may be used in the same device 104. For example, electroluminescent lights may be used in conjunction with LEDs. The one or more light sources 110 may be arranged along one or more edges of a perimeter 112 of the light guide panel 108 and may be arranged above, within, or below the plane of the light guide panel 108. The one or more light sources 110 are adjacent to and may be optically coupled to the light guide panel 108 such that light emitted from the one or more light sources 110 is distributed to at least a portion of the display panel 106.

The optical coupling between the light guide panel 108 and the one or more light sources 110 may comprise one or more of physical proximity, an air gap, an adhesive, a mechanical interface, and so forth. In some implementations, one or more surface features may be provided on the light guide panel 108, the light source 110, or both. These surface features, such as diffusers, grooves, grating, dimples, lenses, planar surfaces, concave surfaces, convex surfaces, and so forth, may be used to enhance or attenuate the transmission or dispersion of light between the one or more light sources 110 and the light guide panel 108. In some implementations, these surface features may be separate or discrete elements which have been coupled to the light guide panel 108. For example, a microlens array may be adhered to the light guide panel 108 to aid the optical coupling with an light source 110.

The one or more light sources 110 and other components may be arranged within a chassis 114 or exterior case. Within the chassis 114 are one or more light sensors 116. The one or more light sensors 116 are configured to detect a flux of incident photons in the ambient light 102. In some implementations the one or more light sensors 116 may be coupled to the light guide panel 108, provided with an aperture in the chassis 114, optically coupled to a light guide integral with or coupled to the chassis 114, and so forth. The incident photons may comprise photons in infrared, visible, or ultraviolet wavelengths, or a combination thereof. The light sensor 116 may comprise a photocell, a phototransistor, a photoresistor, photodiodes, reverse-biased LED, and so forth. In some implementations, at least a portion of the one or more the light sources 110 may be used as a light sensor. For example, where the light source 110 comprises an LED, it may be reverse-biased to generate a signal indicative of incident photons. The light sensor 116 may comprise an analog, digital, or mixed analog-digital device. The one or more light sensors 116 may be configured to detect one or more of visible light, infrared, or ultraviolet. In some implementations, different types of light sensors 116 may be used on the same device 104. For example, one light sensor 116 sensitive to near infrared may be used as well as another light sensor 116 sensitive to visible light.

An illumination control module 118 may be coupled to the one or more light sources 110 and the light sensor 116. The illumination control module 118 may comprise an ambient light module 120 and an light source drive module 122. The ambient light module 120 is configured to receive one or more signals from the one or more light sensors 116 and determine an ambient light level. This ambient light level may comprise a flux of photons with infrared wavelengths, visible wavelengths, ultraviolet wavelengths, or a combination thereof. The light source drive module 122 is configured to drive the one or more light sources 110, such as activating them to emit light when in an active state or deactivating them to cease emitting light when in an inactive state. As described above, the one or more light sources 110 may emit photons with infrared wavelengths, visible wavelengths, ultraviolet wavelengths, or a combination thereof. The light source drive module 122 may be configured to provide variable illumination intensity with the one or more light sources 110. This variation in illumination may be provided to improve user experience, to reduce power consumption, and so forth. In some implementations, such as where the one or more light sources 110 comprise LEDs, the light source drive module 122 may be configured to drive the LEDs with a pulse-width modulated signal.

The illumination control module 118 may be configured with a minimum ambient light threshold, below which illumination is provided by the one or more light sources 110. Similarly, a maximum ambient light threshold may be configured, above which illumination is discontinued. For example, a pre-determined level of illumination may be provided in a dark room where the ambient light level is below the minimum ambient light threshold. The illumination intensity may increase as the ambient light level increases, until the ambient light level reaches the maximum ambient light threshold when the illumination is discontinued.

In some implementations, the ambient light module 120 may be configured to determine characteristics about the ambient light, such as color temperature. For example, the ambient light module 120 may receive data from the one or more light sensors 116 and determine a source of ambient illumination such as sunlight, fluorescent bulbs, incandescent bulbs, LEDs, and so forth. This determination may then be used to alter illumination. The determination of the source of ambient illumination may be provided to a display driver module to allow for adjustment of a presented image in response thereto, and so forth. For example, under a source of ambient light, which has a higher color temperature and thus appears more blue, the colors on a color display may be adjusted to maintain a desired output. Likewise, the light source drive module 122 may be configured to modify the light emitted by the one or more light sources 110 to compensate at least in part for the source of ambient light.

In some implementations, the illumination control module 118 may also be coupled to a display drive module configured to drive the display panel 106. These couplings may be electrical, such as provided by wires or conductive traces on a circuit board, cable, and so forth. The illumination control module 118 is configured to control the operation of the one or more light sources 110 based at least in part on input from the light sensor 116. The illumination control module 118 may also be configured to vary illumination based at least in part on an image presented on the display panel 106. For example, where the image presented is mostly light colors such as a blank page sparsely filled with black text, the illumination may be set to a lower level than when the image presented is mostly dark colors such as a grayscale photograph.

In one implementation, changes to the ambient light level may be used to effect changes in the operation of the display panel 106, and vice versa. For example, in low light conditions, the light sources 110 may be set to increase the intensity of illumination while the display panel 106 may be configured to change contrast settings.

The modules described herein may comprise analog, digital, or mixed analog and digital circuitry. In one implementation, one or more processors may be used to provide the functions described herein.

Figure 2:
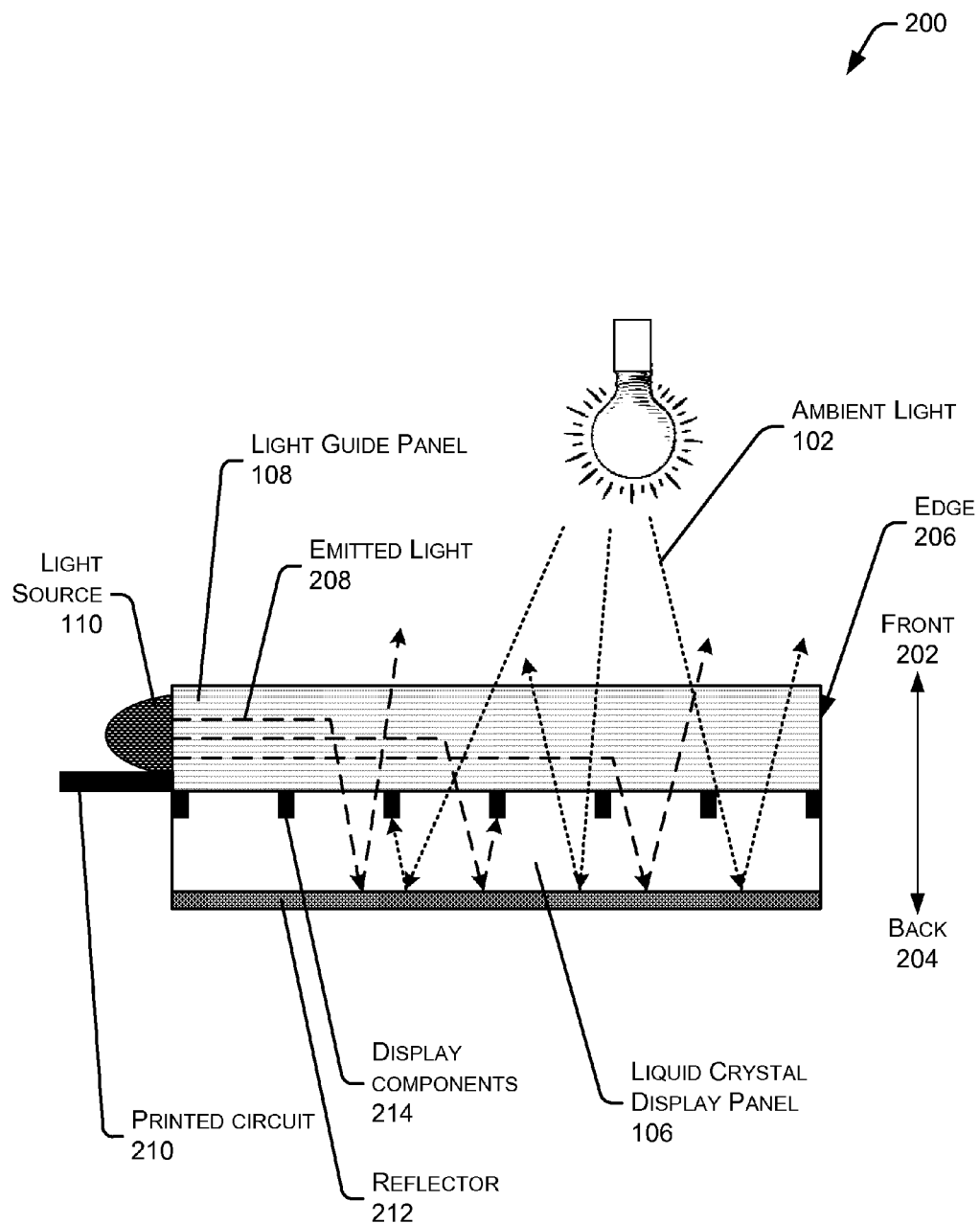
FIG. 2 illustrates a cross sectional view (not to scale) along line "C" of one implementation of the device of FIG. 1 in which the light guide panel is arranged in front of the LCD.

FIG. 2 illustrates a cross sectional view 200 along line "C" of one implementation of the device of FIG. 1. In this cross section, a front 202 and a back 204 relative to the device 104 is indicated along the Z axis. As described above, for clarity of illustration, the figures in this disclosure are not depicted to scale. For example, the light guide panel 108 and the display panel 106 may be shorter along the Z axis than the light sources 110, the light sensor 116, and so forth.

In this view, the light guide panel 108 is in front of the display panel 106. Around the perimeter 112 of the light guide panel 108 are one or more edges 206. These edges 206 are depicted here as being planar and generally perpendicular to the plane of the light guide panel 108. However, in other implementations, the edges 206 may be concave, convex, tapered, or have other shapes.

The light source 110 is shown optically coupled to one of the edges 206 of the light guide panel 108. In one implementation, the light source 110 may comprise a side-firing light emitting diode, with an emission side abutting the edge 206. The light guide panel 108 is configured to distribute at least a portion of emitted light 208 (illustrative rays shown here with dashed lines) from the one or more light sources 110 to the front side of the display panel 106. This distribution of emitted light 208 serves to illuminate the display panel 106 and the image presented thereon.

The optical coupling between the light guide panel 108 and the one or more light sources 110 may comprise one or more of physical proximity, an air gap, an adhesive, a mechanical interface, and so forth. In some implementations, one or more surface features may be provided on the light guide panel 108, the light source 110, or both. These surface features, such as diffusers, grooves, grating, dimples, lenses, planar surfaces, concave surfaces, convex surfaces, and so forth, may be used to enhance or attenuate the transmission of light between the one or more light sources 110 and the light guide panel 108. In some implementations, these surface features may be separate or discrete elements which have been coupled to the light guide panel 108. For example, a microlens array may be adhered to the light guide panel 108 to aid the optical coupling with an light source 110.

In some implementations, optical features may be internal to the light guide panel 108 instead of, or in addition to, surface features. For example, regions with materials of differing indices of refraction may be used to form internal features to direct light within the light guide panel 108 or to interface points such as proximate to the one or more light sources 110, lights sensors 116, the front of the display panel 106, and so forth.

The light source 110, the light sensor 116, and so forth, may be affixed to a printed circuit 210. This printed circuit 210 may comprise flexible materials including, but not limited to, flexible printed circuits comprising a plastic and metallic laminate, polyimide, polyether ether ketone, and so forth. In some implementations, the printed circuit 210 may be rigid or semi-rigid, or a combination of flexible, rigid, and semi-rigid materials.

Disposed behind or to the back 204 of the liquid crystal display panel 106 is the reflector 212. The reflector 212 may comprise a mirror, film, paint, coating, and so forth. In one implementation, aluminum may be deposited on a back side of the display panel 106 to form the reflector. In some implementations, the reflector 212 may contain optically dispersive features. For example, the reflector 212 may include a holographic pattern, textured surface, irregular features, and so forth. A reflective film may be laminated to the liquid crystal display panel 106.

The liquid crystal display panel 106 may include one or more display components 214. At least some of these display components 214 may be considered optically disruptive. That is, they may impair the transmittance of light or result in change in direction of light passing through the liquid crystal display panel 106. For example, as shown here, some of the emitted light 208 and the ambient light 102 is blocked by some of the display components 214. The display components 214 may include, but are not limited to electrodes, transistors, optical channels, and so forth.

Figure 3:
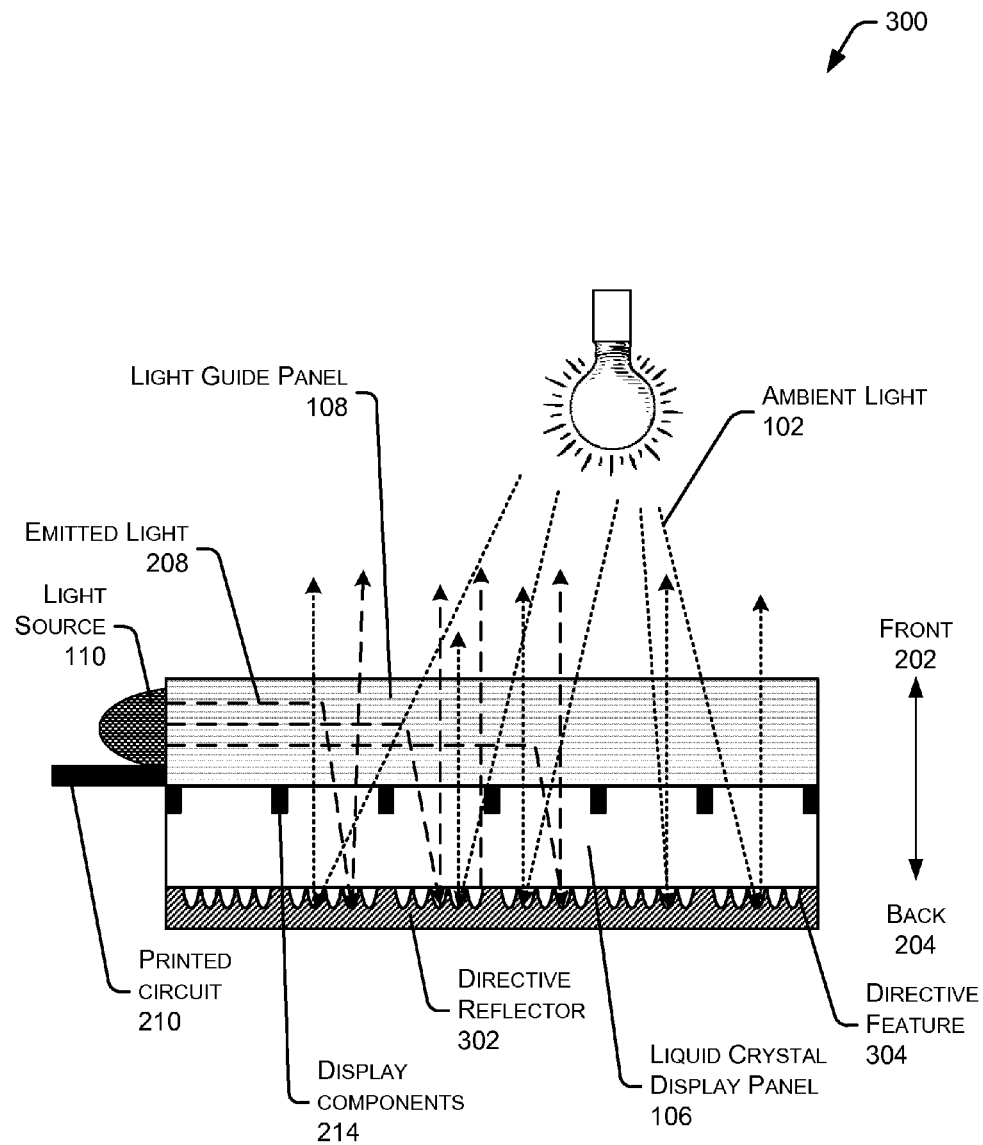
FIG. 3 illustrates a cross sectional view (not to scale) along line "C" of one implementation of the device of FIG. 2 in which a directive reflector is arranged behind the LCD.

FIG. 3 illustrates a cross sectional view 300 along line "C" of one implementation of the device of FIG. 2. In this implementation, a directive reflector 302 is disposed behind the liquid crystal display panel 106. The directive reflector 302 generally describes a planar shape and may comprise one or more materials such as plastic, glass, aerogel, metal, ceramic, and so forth. These materials may be configured to act as mirrors or be optically dispersive to incident light. The directive reflector 302 may be configured with one or more directive features 304 on the surface thereof, integral with, or embedded within, which are configured to direct light along pre-determined paths. These pre-determined paths may be configured to avoid at least a portion of the display components 214.

In one implementation, the directive reflector 302 may comprise a plurality of directive features 304 which provide for one or more of refraction, diffraction, reflection, and so forth of incident light. The directive features 304 may comprise structures configured to selectively accept light incident at a first angle and reflect it at a second angle. These structures may include one or more of a diffuser, groove, grating, dimple, lens, planar surface, concave surface, or convex surface. For example, as depicted here the directive features 304 may comprise faceted wells with reflective walls. In another implementation, the directive features 304 may comprise convex features protruding or extending from an overall plane of the directive reflector 302. For example, the directive features may comprise dimples on the surface of the reflector 302. The directive reflector 302 may be configured to direct at least fifty percent of incident light to avoid the display components 214.

As illustrated here, the light reflected by the directive reflector 302 is directed to avoid at least a portion the display components 214. By avoiding at least a portion of these display components 214, the overall reflectivity of the display may be improved. By increasing overall reflectivity less illumination from the ambient light 102, the one or more light sources 110, or both may be used to present the image to the user.

Figure 4:
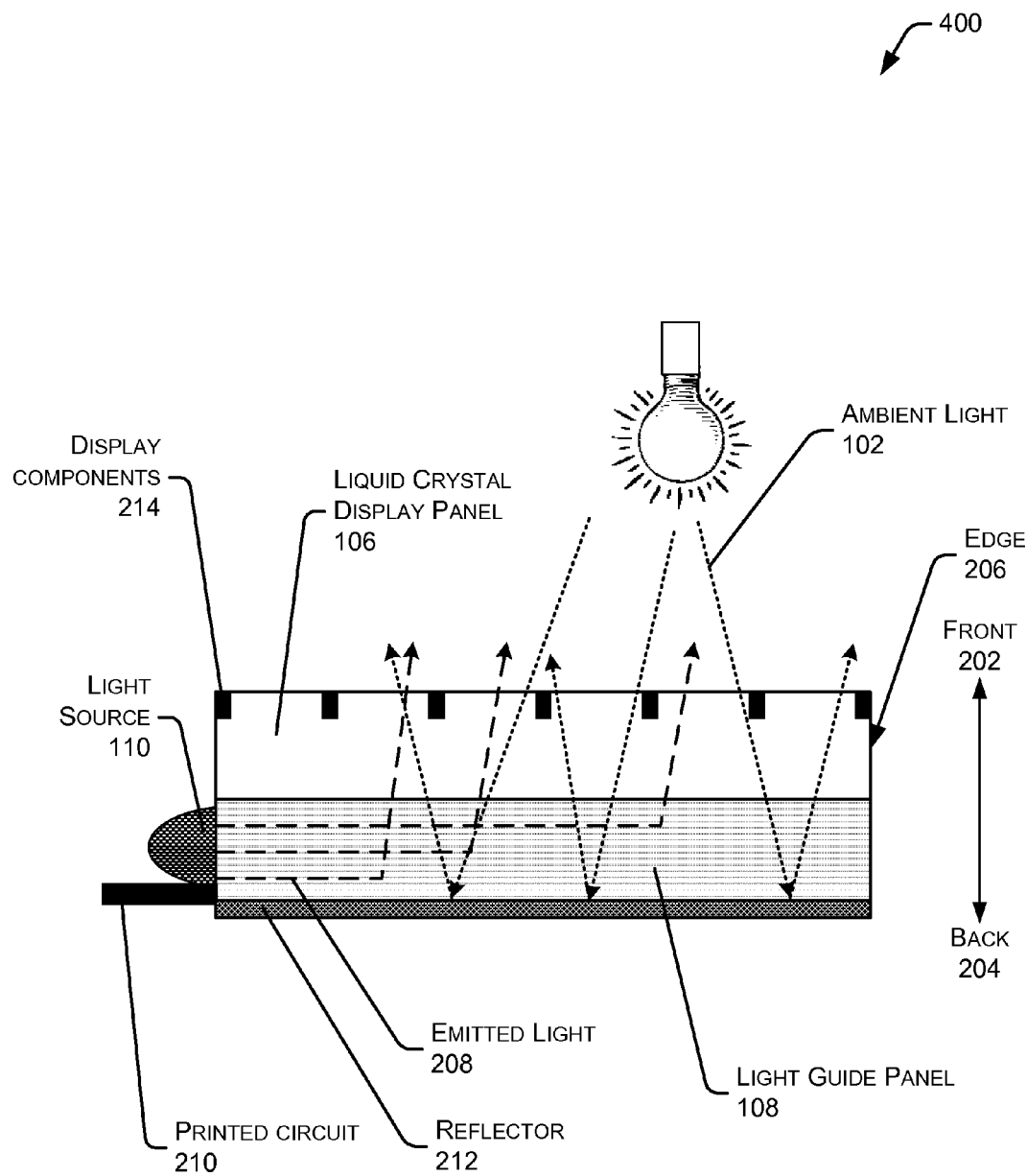
FIG. 4 illustrates a cross sectional view (not to scale) along line "C" of one implementation of the device of FIG. 1 in which the light guide panel is arranged behind the LCD and in front of a reflector.

FIG. 4 illustrates a cross sectional view 400 (not to scale) along line "C" of another implementation of the device of FIG. 1. In this implementation, the light guide panel 108 is disposed behind the liquid crystal display panel 106 and configured such that the light emitted from the light guide panel 108 is directed towards the display panel 106. The light guide panel 108 may thus backlight the liquid crystal display panel 106. The light guide panel 108 may placed in this configuration to provide for a backlight having a minimal thickness along the Z axis.

In some implementations the light guide panel 108 may experience speckles, dark spots, or other irregularities. These irregularities may be due to the manufacturing process, variation in materials, and so forth. Placement of the light guide panel 108 in the configuration shown here may minimize user perception of these irregularities, improving the user experience.

Arranged behind the light guide panel 108 in this configuration is the reflector 212 or the directive reflector 302. The ambient light 102 falling on the display panel 106 passes through the display panel 106 and the light guide panel 106, to the reflector 212 or directive reflector 302 whereupon at least a portion of the light is reflected.

The light guide panel 108 may be configured to direct the emitted light 208 such that at least a portion of the display components 214 are avoided. For example, features of the light guide panel 108 may be configured to direct light along paths which provide for reduced interaction with the optically distorting display components 214.

Figure 5:
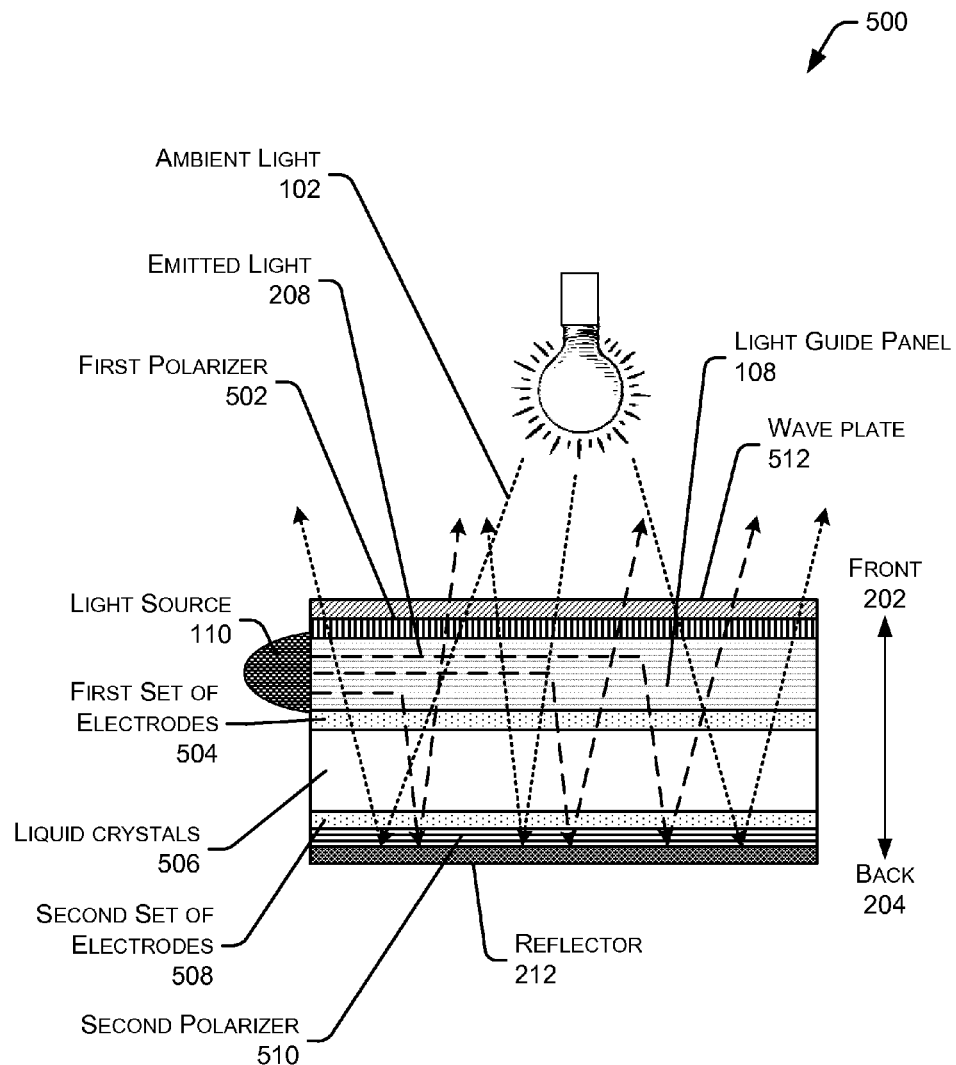
FIG. 5 illustrates a cross sectional view (not to scale) along line "C" of another implementation of the device of FIG. 1 in the light guide panel is arranged within a LCD stack between a first polarizer and a reflector.

FIG. 5 illustrates a cross sectional view 500 (not to scale) along line "C" of another implementation of the device of FIG. 1. In this implementation the light guide panel 108 is integrated into the liquid crystal display 106.

The liquid crystal display panel 106 may comprise several layers or stack. In one implementation, these layers may include a first polarizer 502, a first set of electrodes 504, a layer of liquid crystal material 506, a second set of electrodes 508, and a second polarizer 510. Other layers may be present, such as color filters, protective films, sealants, and so forth. The reflector 212 or the directive reflector 302 may be arranged behind the second polarizer 510.

The light guide panel 108 may be arranged between these layers. In the implementation depicted here, the light guide panel 108 is arranged between the first polarizer 502 and the first set of electrodes 504. The light guide panel 108 is configured to direct emitted light 208 towards the liquid crystals 506. In another implementation, the light guide panel 108 may be arranged between the second set of electrodes 508 and the second polarizer 510. In yet another implementation, the light guide panel 108 may be arranged between the second polarizer 510 and the reflector 212 or the directive reflector 302.

In some implementations a wave plate 512 or an optical retarder may be placed in front 202 of the first polarizer 502. The wave plate 512 may comprise a birefringent material configured shift the phase between two perpendicular polarization components of incident light. In some implementations this may comprise a quarter-wave plate which creates a quarter-wavelength phase shift. The quarter-wave plate is configured to transition light from linear to circularly polarization. The wave plate 512 may be used to improve viewability in conditions where another polarizer is in the optical path between the eye of a user and the device 104. For example, the wave plate 512 may improve viewability by changing polarization such that a user wearing polarized eyeglasses is able to see the image formed by the liquid crystals 506.

Figure 6:
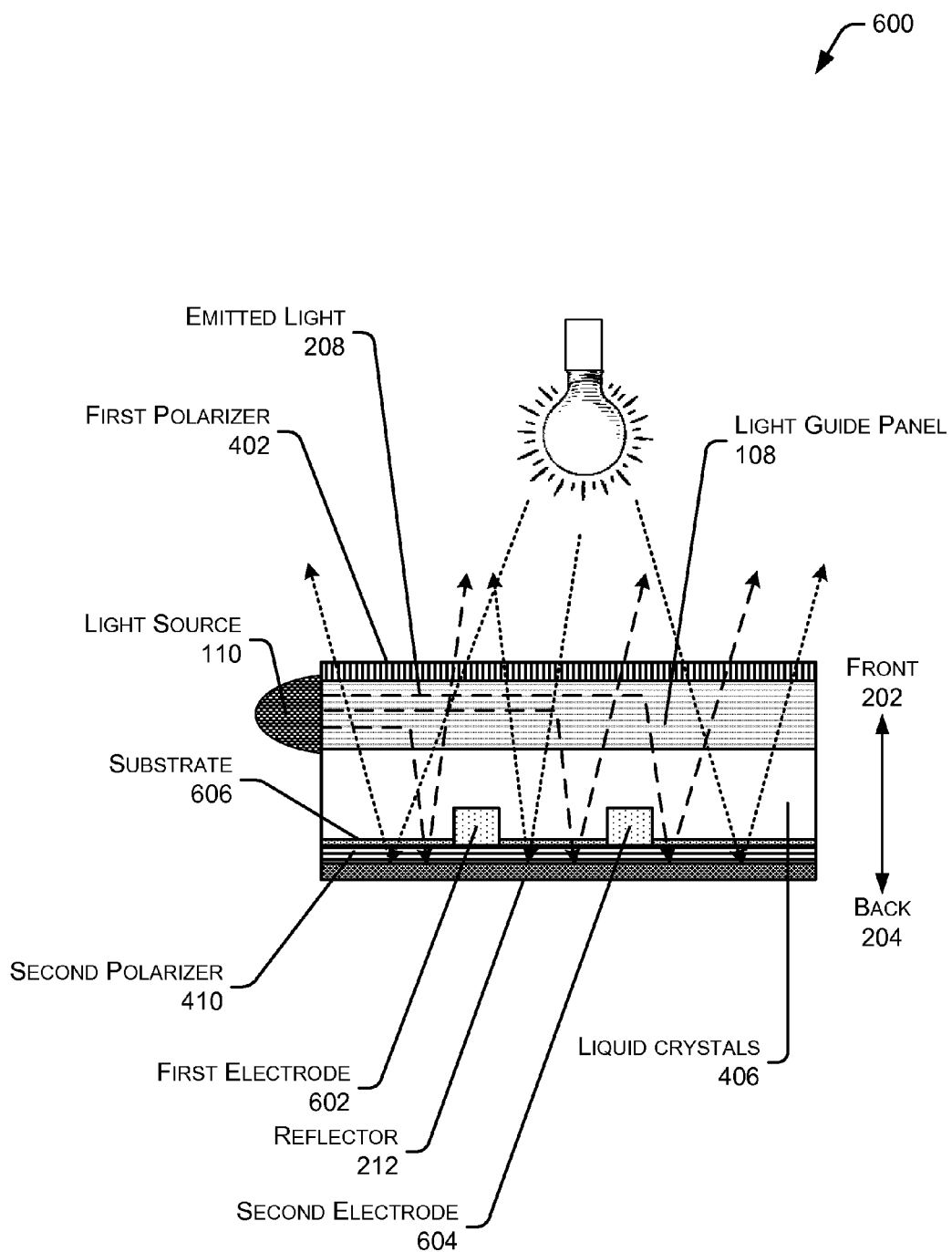
FIG. 6 illustrates a cross sectional view (not to scale) along line "C" of another implementation of the device of FIG. 1 in which the LCD comprises an in-plane switching ("IPS") configuration.

FIG. 6 illustrates a cross sectional view 600 (not to scale) along line "C" of another implementation of the device of FIG. 1. In this implementation, the liquid crystal display panel 106 comprises an in-plane switching ("IPS") configuration.

In the IPS configuration, a first electrode 602 and a second electrode 604 are arranged on a substrate 606. In some implementations the substrate 606 may act as the reflector 212 or the directive reflective 302. This may be instead of, or in addition to, the reflector 212 or directive reflector 302 behind the second polarizer 410. The first electrode 602 and the second electrode 604 may be in contact with the liquid crystals 406. In some implementations the electrodes may be shaped to direct incident light. For example, the first electrode 602 and the second electrode 604 may be faceted directive features 304

Similar to that described above with regard to FIG. 2, in this arrangement, the light guide panel 108 is in front of the display panel 106. The light guide panel 108 may be configured to direct at least a portion of the emitted light 208 away from features on the substrate 606 which are less reflective, non-reflective, or otherwise optically disruptive. For example, the light guide panel 108 may direct at least a portion of the emitted light 208 as illustrated here to avoid the first electrode 602 and the second electrode 604. By reducing the emitted light 208 which is affected by optically disruptive material, overall reflectivity of the emitted light 208 may be improved.

Illustrative Processes

Figure 7:
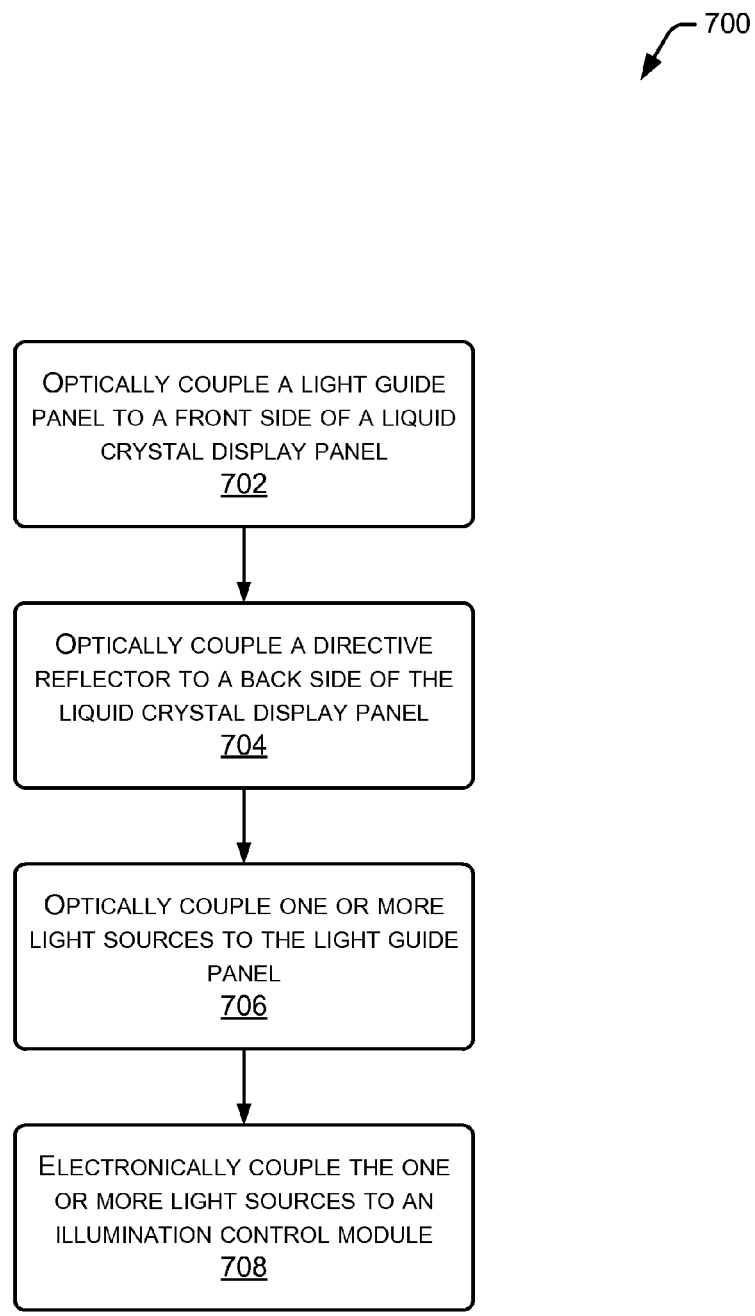
FIG. 7 illustrates a flow diagram of a process of manufacturing the device.

FIG. 7 illustrates a flow diagram of a process 700 of manufacturing the device 104. The following operations may be performed by manual, automated, or combined automated and manual means.

At 702, the light guide panel 108 is optically coupled to the front side of the display panel 106. For example, the light guide panel 108 may be laminated to the display panel 106 using one or more of heat, pressure, or adhesive.

At 704, a reflector is optically coupled to the back side of the display panel 106. This may comprise the reflector 212 or the directive reflector 302. The reflector may a mirror, a film, paint, a deposited coating, and so forth. For example, aluminum may be deposited on a back side of the display panel 106 to form the reflector.

At 706, the one or more light sources 110 are optically coupled to the light guide panel 108. For example, the one or more light sources 110 may be placed proximate to predetermined light in-coupling points on the edge 206 of the light guide panel 108. The optical coupling may involve establishing a mechanical alignment between one or more features on the light guide panel 108 and the one or more light sources 110. As described above, the one or more light sources 110 may be configured to generate photons in infrared wavelengths, visible wavelengths, ultraviolet wavelengths, or a combination thereof.

At 708, the one or more light sources 110 are electronically coupled to the illumination control module 118. In one implementation, the one or more light sources 110 and the illumination control module 118 may be placed on the printed circuit 210 and coupled to conductive pathways thereon thus providing an electronic coupling between the components.

CONCLUSION

The processes described and shown above may be carried out or performed in any suitable order as desired in various implementations. Additionally, in certain implementations, at least a portion of the processes may be carried out in parallel. Furthermore, in certain implementations, less than or more than the processes described may be performed.

Certain aspects of the disclosure are described above with reference to flow diagrams of methods, apparatuses, or computer program products according to various implementations. It will be understood that one or more blocks of the flow diagrams, and combinations of blocks in the flow diagrams, can be implemented by computer-executable program instructions. Likewise, some blocks of the flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the flow diagrams support combinations of means for performing the specified functions, combinations of elements or steps for performing the specified functions and program instruction means for performing the specified functions. It will also be understood that each block of the flow diagrams, and combinations of blocks in the flow diagrams, can be implemented by special-purpose, hardware-based computer systems that perform the specified functions, elements or steps, or combinations of special-purpose hardware and computer instructions.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims.

What is claimed is:

1. A device, comprising:
a liquid crystal display panel having a front side, a back side comprising a reflector, and a plurality of optically disruptive display components, wherein the reflector comprises a plurality of features configured to selectively direct a portion of light incident on the reflector to avoid at least a portion of the plurality of optically disruptive display components;
a light guide panel having a front side, a back side, and one or more edges, the back side of the light guide panel placed adjacent to the front side of the liquid crystal display panel, wherein the light guide panel comprises a plurality of surface relief structures on the order of about 10 microns or less in one lateral dimension configured to distribute light from one or more light sources arranged around at least a portion of the one or more edges onto at least a portion of the front side of the liquid crystal display panel.

2. The device of claim 1, the reflector comprising an aluminum layer at least 800 nanometers thick.

3. The device of claim 1, wherein the selectively directed portion is at least fifty percent of the light incident on the reflector.

4. The device of claim 3, the plurality of features comprising one or more of a diffuser, groove, grating, dimple, lens, planar surface, concave surface, or convex surface.

5. The device of claim 1, the liquid crystal display configured to produce color images.

6. The device of claim 1, further comprising:
a light sensor configured to measure an ambient light level;
a display control module configured to present images on the liquid crystal display panel;

an illumination control module electronically coupled to the one or more light sources, the light sensor, and the display control module, the illumination control module configured to:
   receive from the display control module an indication that the liquid crystal display panel is presenting an image to illuminate; and
   based at least in part on the measured ambient light and the indication, activate the one or more light sources.

7. The device of claim 1, further comprising one or more light sources coupled to the one or more edges of the light guide panel.

8. The device of claim 1, wherein at least a portion of the light guide panel extends beyond at least a portion of the liquid crystal display panel and the optical coupling between the light guide panel and the one or more light sources are on the back side or the front side of the light guide panel.

\* \* \* \* \*